US 10,273,177 B2

(12) United States Patent
Vlahogeorge

(10) Patent No.: US 10,273,177 B2
(45) Date of Patent: Apr. 30, 2019

(54) APPARATUS FOR LIFTING LIQUID IN A BODY OF LIQUID

(71) Applicant: John T. Vlahogeorge, West Lafayette, IN (US)

(72) Inventor: John T. Vlahogeorge, West Lafayette, IN (US)

(*) Notice: Subject to any disclaimer, the term of this patent is extended or adjusted under 35 U.S.C. 154(b) by 0 days.

(21) Appl. No.: 15/724,339

(22) Filed: Oct. 4, 2017

(65) Prior Publication Data

US 2018/0022627 A1 Jan. 25, 2018

Related U.S. Application Data

(63) Continuation of application No. 15/008,568, filed on Jan. 28, 2016, now Pat. No. 9,809,465, which is a continuation-in-part of application No. 14/454,077, filed on Aug. 7, 2014, now Pat. No. 9,434,631.

(51) Int. Cl.
| | |
|---|---|
| *C02F 7/00* | (2006.01) |
| *B01F 3/04* | (2006.01) |
| *C02F 11/00* | (2006.01) |
| *B01D 21/24* | (2006.01) |
| *C02F 1/24* | (2006.01) |
| *C02F 103/20* | (2006.01) |

(52) U.S. Cl.
CPC .......... *C02F 11/00* (2013.01); *B01D 21/2466* (2013.01); *B01D 21/2472* (2013.01); *B01F 3/04106* (2013.01); *C02F 1/24* (2013.01); *C02F 7/00* (2013.01); *B01F 2003/04141* (2013.01); *B01F 2003/04304* (2013.01); *C02F 2103/20* (2013.01)

(58) Field of Classification Search
CPC .... C02F 7/00; B01D 21/2466; B01F 3/04099; B01F 3/04106; B01F 2003/04141; B01F 2003/04304
USPC ........ 210/170.06, 170.09, 747.5; 261/28, 29, 261/77, 123
See application file for complete search history.

(56) References Cited

U.S. PATENT DOCUMENTS

| | | | |
|---|---|---|---|
| 1,694,668 A | 12/1928 | Peters | |
| 1,703,041 A | 2/1929 | Imhoff | |
| 2,732,944 A | 1/1956 | Hays | |
| 3,013,395 A | 12/1961 | Gaylord | |
| 3,671,022 A * | 6/1972 | Laird | ................ B01F 3/04609 210/170.09 |
| 3,916,834 A | 11/1975 | Buss | |
| 3,956,124 A * | 5/1976 | Fast | ....................... C02F 7/00 210/170.06 |

(Continued)

FOREIGN PATENT DOCUMENTS

| | | | |
|---|---|---|---|
| DE | 813995 | * | 9/1951 |
| DE | 2 061 266 | | 12/1970 |
| DE | 43 25 010 A1 | | 2/1995 |

*Primary Examiner* — Christopher Upton
(74) *Attorney, Agent, or Firm* — Woodward, Emhardt, Henry, Reeves & Wagner, LLP

(57) ABSTRACT

An apparatus to lift liquid from a reservoir of liquid and aerate the liquid. A downwardly opening enclosure has an inlet for liquid to flow from a reservoir into the enclosure. The enclosure includes a channel for the liquid to flow upward. An inner cone within an outer cone forms a gas chamber connected to an external gas compressor. Holes in the gas chamber walls allow the gas to flow into the channel and aerate the liquid which is returned to the reservoir.

8 Claims, 14 Drawing Sheets

(56) References Cited

U.S. PATENT DOCUMENTS

| | | | |
|---|---|---|---|
| 3,994,811 A | 11/1976 | Cohen et al. | |
| 4,163,035 A | 7/1979 | Gorsky | |
| 4,181,614 A | 1/1980 | Steenhorst | |
| 4,278,546 A | 7/1981 | Roesler | |
| 4,368,691 A | 1/1983 | Brune | |
| 4,376,048 A | 3/1983 | Kovacs | |
| 4,448,689 A | 5/1984 | von Nordenskjold | |
| 4,474,713 A * | 10/1984 | Wickoren | B01F 3/0473 |
| | | | 210/170.06 |
| 4,600,338 A | 7/1986 | Van Bruwaene et al. | |
| 4,690,756 A * | 9/1987 | Van Ry | C02F 1/24 |
| | | | 210/170.06 |
| 4,752,421 A * | 6/1988 | Makino | C02F 7/00 |
| | | | 261/77 |
| 4,863,594 A | 9/1989 | Pedretti | |
| 4,913,819 A | 4/1990 | Patterson | |
| 4,921,614 A | 5/1990 | Frickman et al. | |
| 5,071,550 A * | 12/1991 | Bernhardt | C02F 7/00 |
| | | | 261/123 |
| 5,139,659 A | 8/1992 | Scott | |
| 5,161,914 A | 11/1992 | Rahn et al. | |
| 5,176,838 A | 1/1993 | Chin et al. | |
| 5,199,378 A | 4/1993 | Kissick, Jr. et al. | |
| 5,217,609 A | 6/1993 | Holdeman | |
| 5,435,924 A | 7/1995 | Albertson | |
| 5,538,627 A | 7/1996 | Gargiulo | |
| 5,755,976 A * | 5/1998 | Kortmann | C02F 7/00 |
| | | | 210/170.06 |
| 5,772,885 A | 6/1998 | Sarrouh | |
| 6,220,822 B1 | 4/2001 | Khudenko | |
| 6,234,323 B1 | 5/2001 | Sarrouh | |
| 6,281,253 B1 * | 8/2001 | Satterfield | B01F 5/0451 |
| | | | 44/301 |
| 6,878,295 B2 | 4/2005 | Hubenthal et al. | |
| 6,953,528 B2 | 10/2005 | Nesfield | |
| 7,105,096 B2 | 9/2006 | Meurer | |
| 7,284,670 B2 | 10/2007 | Schmid | |
| 7,459,076 B2 | 12/2008 | Cote et al. | |
| 7,462,290 B2 | 12/2008 | Hauge et al. | |
| 8,372,274 B2 | 2/2013 | Early et al. | |
| 8,440,073 B2 | 5/2013 | Chen | |
| 9,434,631 B2 | 9/2016 | Vlahogeorge | |
| 9,809,465 B2 * | 11/2017 | Vlahogeorge | B01D 21/2466 |
| 2006/0006126 A1 | 1/2006 | Hadfield et al. | |
| 2014/0169989 A1 | 6/2014 | Nakamura et al. | |
| 2018/0296989 A1 * | 10/2018 | Vlahogeorge | C02F 7/00 |

* cited by examiner

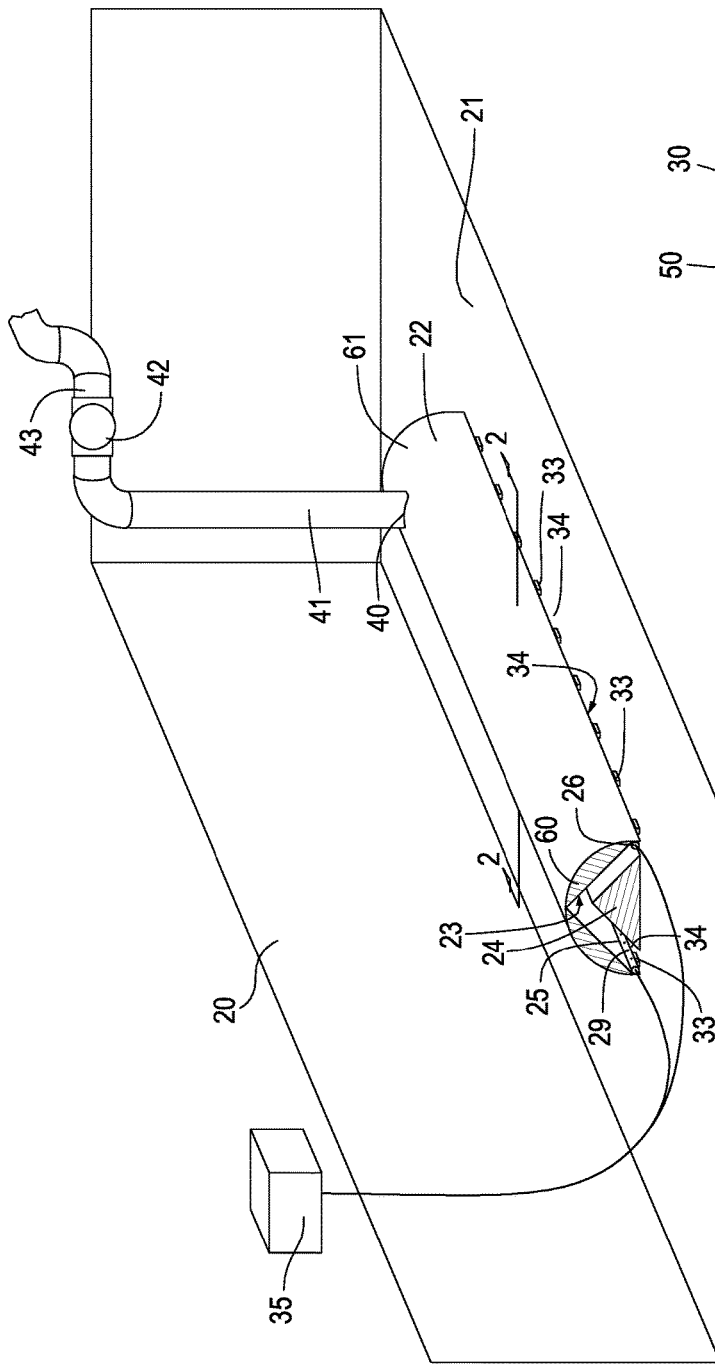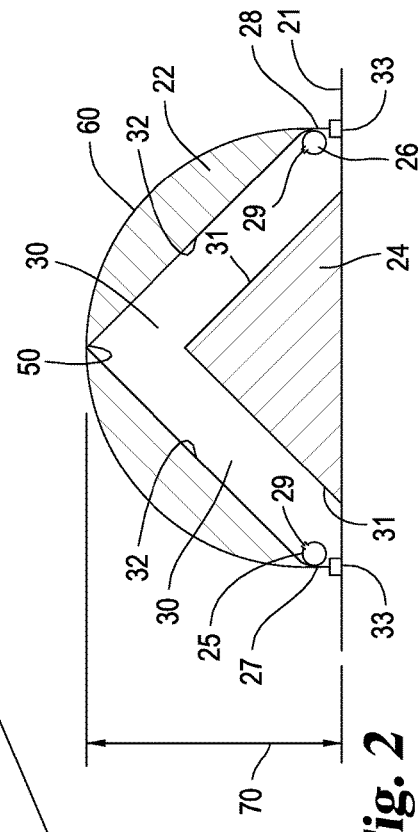
Fig. 1
Fig. 2

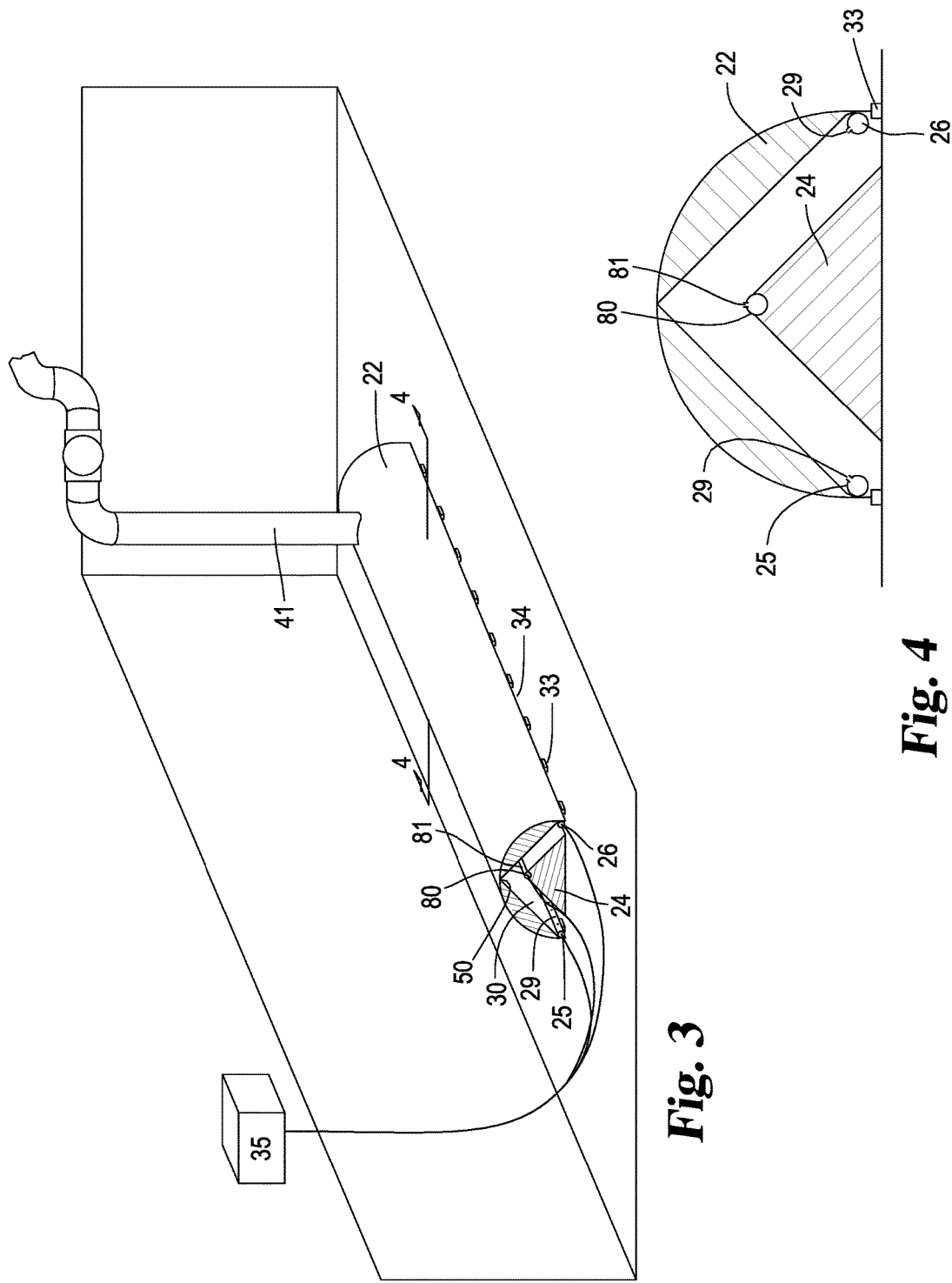

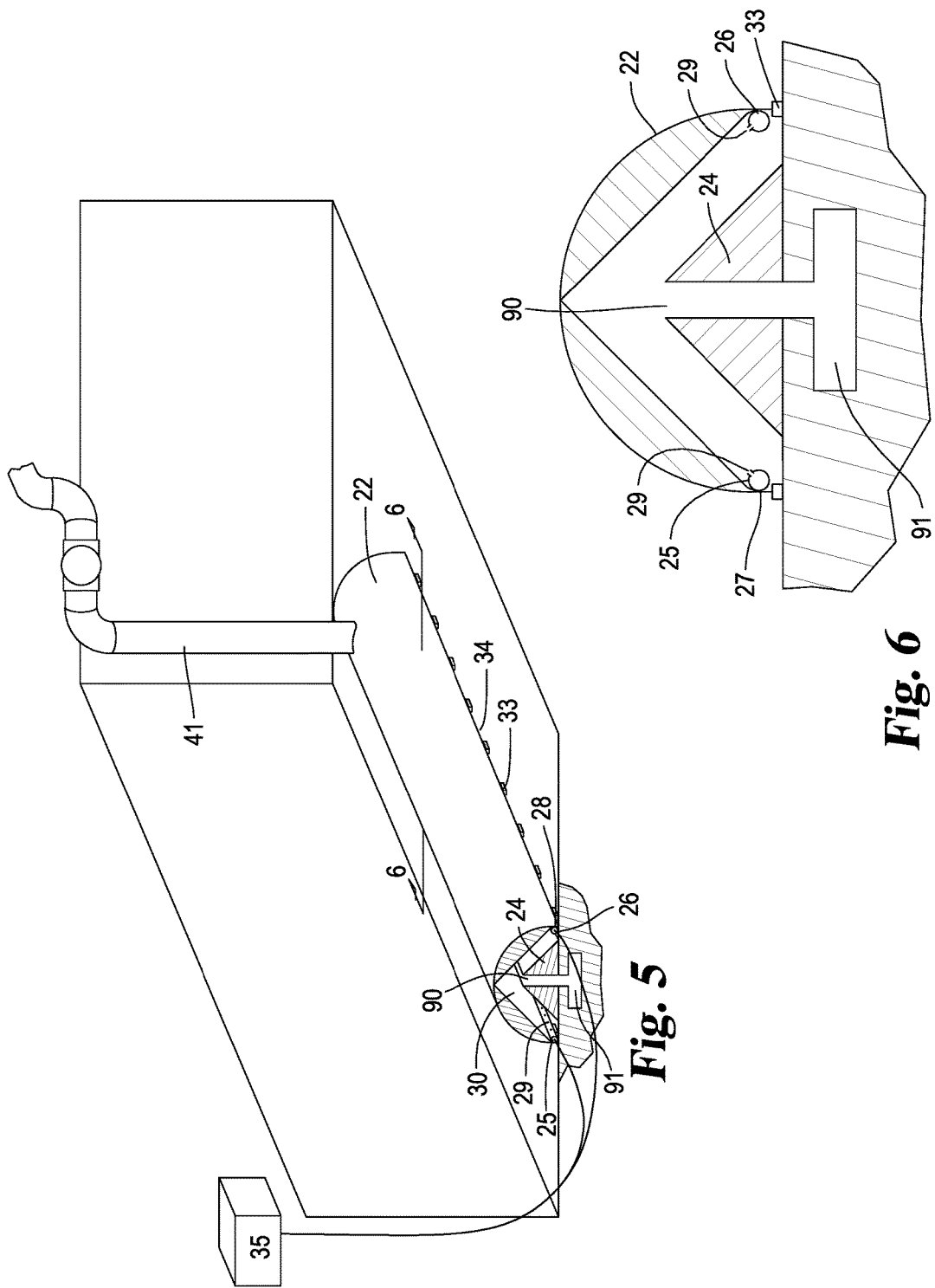

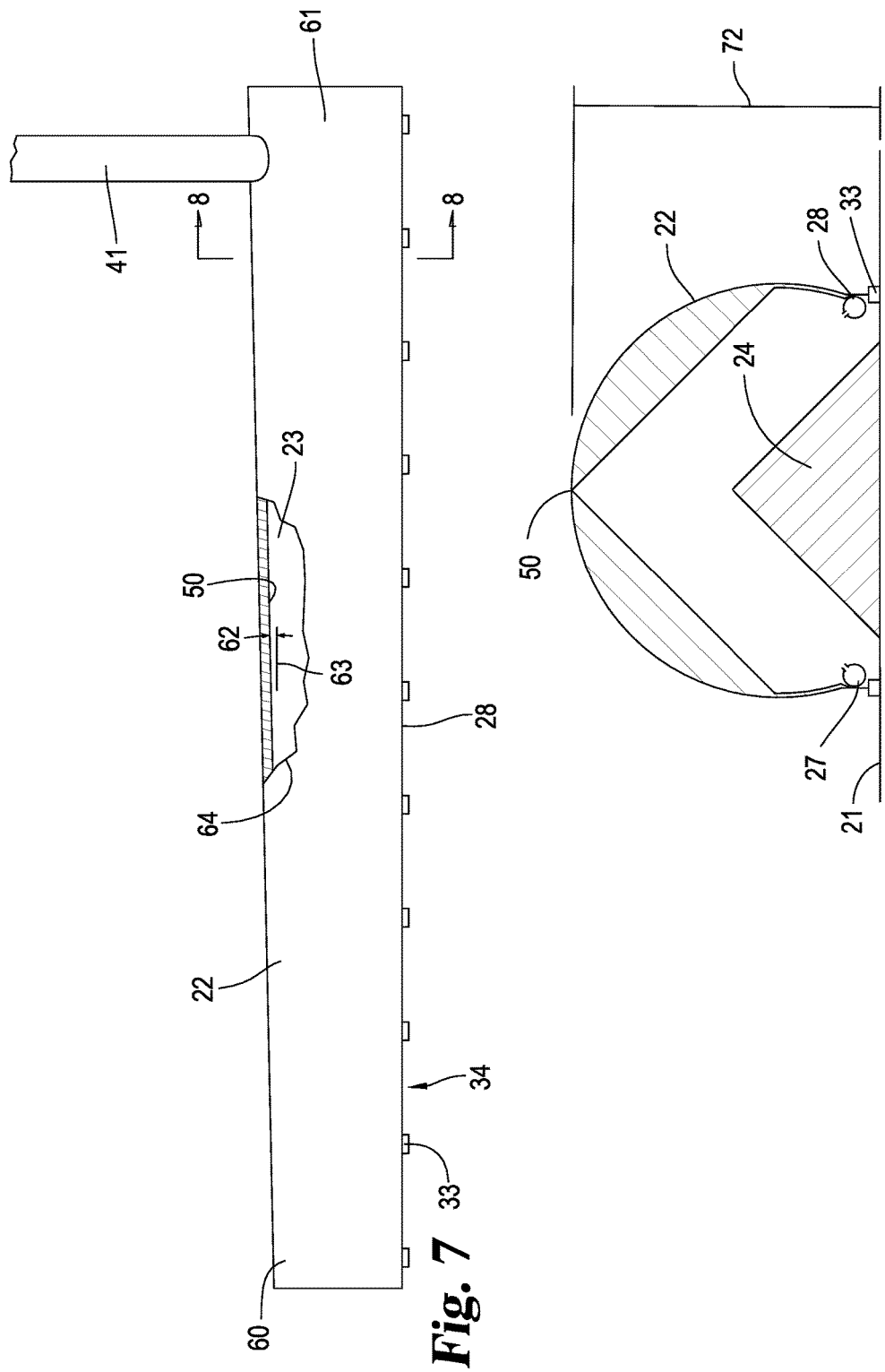

APPARATUS FOR LIFTING LIQUID IN A BODY OF LIQUID

CROSS REFERENCE TO RELATED APPLICATION

This application is a continuation-in-part of U.S. patent application Ser. No. 15/008,568 filed Jan. 28, 2016 which is a continuation-in-part of U.S. patent application Ser. No. 14/454,077, now U.S. Pat. No. 9,434,631 and entitled Apparatus for Removing Material from a Body of Liquid.

BACKGROUND OF THE INVENTION

Field of the Invention

The present invention relates generally to the field of devices for removing foreign material from a body of liquid.

Description of the Prior Art

Many different types of reservoirs including tanks for holding a variety of liquids accumulate foreign material at the bottom of the reservoir or tank. Various types of devices have been provided in an attempt to remove the foreign material, typically through the use of air lift pumps requiring expenditure of large amounts of energy. The expense associated with the removal process adds significantly to the overall cost of maintaining the reservoir and tank. Particularly, in the field of raising shrimp or fish, the foreign material in the water can result in the development of a virus negatively impacting the shrimp. It is possible to place chemicals in the water in an attempt to control the virus; however, certain customers object to the use of chemicals detracting from such an approach. Other approaches include genetically engineering the shrimp to avoid the negative impact of the virus. The ultimate solution is to provide clean water for the raising of the shrimp or fish. I have therefore tried many approaches in providing the cleanest water possible to avoid the above problems.

One possible approach is to provide a cone shaped container in which the water is swirled to a bottom drain whereat the waste material is removed. Such an approach again takes considerable energy. Large outside reservoirs provide a very difficult hurdle in such an approach due to the quantity of the water. An object of this invention is therefore to provide clean water in the reservoir or tank in an efficient and low cost manner.

In the U.S. Pat. No. 4,181,614 assigned to The British Petroleum Company Limited, there is disclosed a horizontally extending pipe having a sloping inverted channel connected at its highest point to a riser pipe. Gas in introduced into the sloping inverted channel to direct the foreign material within the liquid to the riser pipe.

Another approach is disclosed in the U.S. Pat. Nos. 5,772,885 and 6,234,323 issued to Sarrouh which use a horizontally extending conduit moved horizontally on a track across the tank bottom. Both the '885 and '323 patents are directed to removing sludge from a wastewater treatment facility.

Another approach is disclosed in the U.S. Pat. No. 7,105,096 issued to Meurer which employs a horizontally extending pipe connected to a vacuum pump causing low pressure to be applied to the pipe for the removal of sludge from the floor of a basin.

The U.S. Pat. No. 4,600,338 issued to Van Bruwaene et al. discloses a device for removing high density foreign material from the bottom of a body of water by means of a horizontally extending intake duct connected to a riser pipe having an airlift pump thereon. U.S. Pat. No. 5,161,914 issued to Rahn et al. discloses a horizontal trench having a perforated casing attached to a vacuum pump by means of a vertical riser. U.S. Pat. No. 1,703,041 issued to Imhoff discloses a device for supplying compressed air at the bottom of a tank to drive oil particles within sewage to the top level of the tank whereat they are removed. U.S. Pat. No. 8,372,274 issued to Early et al. discloses a wastewater treatment system utilizing pumps and filters for decontaminating the wastewater.

In order to remove the foreign material including sludge from the body of liquid while using minimum energy, I have devised an inverted u-shaped conduit that extends along the bottom of the reservoir or tank that, in turn, is connected to a vertically extending outlet pipe. The conduit includes a restricted channel into which gas is directed to pull the foreign material through the inlets of the horizontally extending conduit and then through the channel to the upper most surface of the cavity of the horizontally extending conduit. The uppermost surface slopes gently upward allowing the gas bubbles to move the foreign material and liquid toward the outlet pipe. The upward slope of the innermost surface of the conduit enables the gas bubbles and liquid flow to move under the force of the gas pressure towards the outlet pipe. The channel is formed by an insert located in the cavity having upwardly facing surfaces opposed to the downwardly facing surfaces of the conduit.

A circular or part circular tank is used in certain instances instead of using an elongated reservoir or tank for holding the shrimp or other animals. I have therefore devised a cone shaped device for fitting inside the circular tank for lifting the foreign material and liquid from the bottom of the tank toward the outlet pipe. A major hurdle encountered in designing the device was to minimize the energy required to lift the material and liquid. By using a flow channel which increases in size as the material moves from the bottom of the tank coupled with an arrangement of injecting air into the channel, the amount of energy is minimized. Disclosed herein is such a design. Further, I have discovered that by using the flow channel which increases in size as the material moves from the bottom of the tank coupled with the arrangement of air injection allows a great increase in the volume of liquid that is moved with a small amount of energy. Thus, such a cone shaped device is not restricted to use with only a circular tank or reservoir but also may be used with an oblong or elongated tank. It is further possible to place multiple cone shaped devices along the length or width of the circular, oblong or elongated tank depending on the volume of water to be moved.

Considerable energy is required to lift liquid, such as water, to the top of a body of liquid. Any reduction in the energy provides a saving over time for the efficient operation of a system used to oxygenate the liquid thereby improving the overall operation of the system. Disclosed is a supplemental liquid lift that may be added to the horizontally extending primary lift devices shown in FIGS. 1, 3 and 5 and to the vertical extending primary lift device shown in FIG. 9.

In the case of aerating water in an outside larger reservoir, further effort is required to install the various components of the aforementioned systems, including the source of pressurized air, vessels for mixing the water and air, and the various conduits for routing the water and air along with the wiring for powering the systems. Disclosed herein is a new system wherein the entire aerating system is located on dry land with the incoming and outgoing water conduits being the only components that extend into the reservoir thereby allowing for a quick installation.

SUMMARY OF THE INVENTION

A preferred embodiment of the present invention is a system located on dry land for withdrawing water from a body of water, aerating same and returning the aerated water back to the body of water. The system includes an air compressor, a water vessel, an outer cone associated with the vessel, and an outer cone having an inwardly facing conical surface. The inner cone is located within the outer cone and has an outwardly facing conical surface spaced apart from the inwardly facing conical surface forming a water passage. A water conduit extends from the body of water to the water vessel to convey water into the water vessel whereas an air conduit extends from the air compressor to the inner cone directing compressed air into the inner cone mixing with the water in a water passage between the cones. A return conduit extends from the outer cone to the body of water to convey aerated water back to the body of water.

It is an object of the present invention to provide a new and improved device for aerating water.

A further object of the present invention is to provide an apparatus having a primary liquid lift device coupled with a supplemental liquid lift device to efficiently to lift liquid from a body of liquid.

A further object of the present invention is to locate a system on dry land that will aerate water withdrawn from a nearby body of water and return aerated water back to the body of water.

Related object and advantages of the present invention will be apparent from the following description.

BRIEF DESCRIPTION OF THE DRAWINGS

FIG. 1 is a cutaway perspective view of an apparatus to remove material from a body of liquid including a conduit extending horizontally across the bottom of the tank with a liquid displacement insert positioned therein and an exit pipe mounted at one end of the conduit.

FIG. 2 is an enlarged cross-sectional view of the conduit and liquid displacement insert taken along line 2-2 of FIG. 1 and viewed in the direction of the arrows.

FIG. 3 is the same view as FIG. 1 only showing an alternate version having an additional gas emitter mounted atop the liquid displacement insert.

FIG. 4 is an enlarged cross-sectional view of the conduit and liquid displacement insert taken along line 4-4 of FIG. 3 and viewed in the direction of the arrows.

FIG. 5 is the same view as FIG. 1 only showing a further version with the liquid displacement insert having a slot through which heavy sludge may flow.

FIG. 6 is an enlarged cross-sectional view of the conduit and liquid displacement insert taken along line 6-6 of FIG. 5 and viewed in the direction of the arrows.

FIG. 7 is a fragmented side view of enclosure 22 of FIG. 1 illustrating the positioning of the upper surface 50 of the cavity relative to the horizontal.

FIG. 8 is an enlarged cross-sectional view taken along the line 8-8 of FIG. 7 and viewed in the direction of the arrows.

DESCRIPTION OF THE PREFERRED EMBODIMENTS

Figure 9:
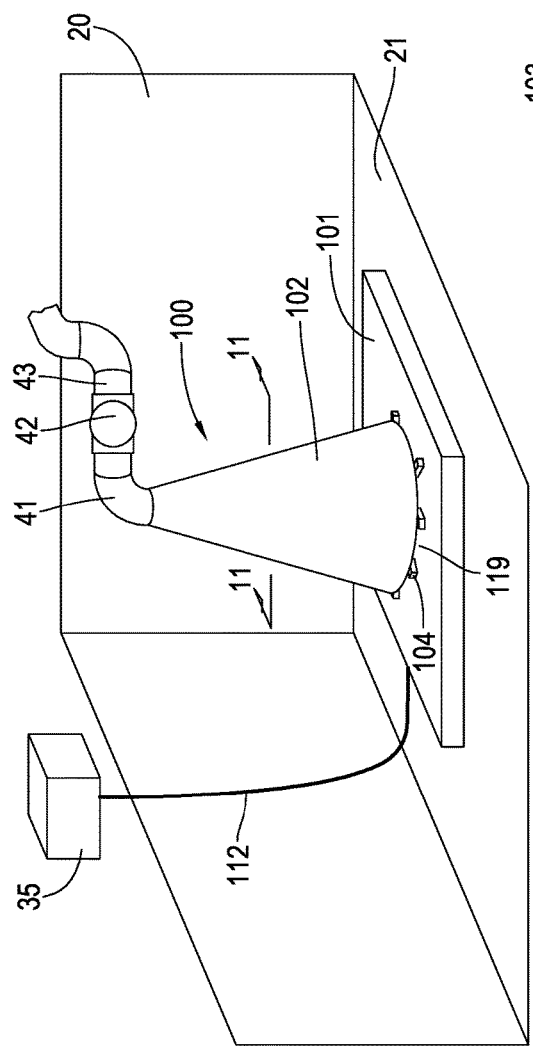
FIG. 9 is a cutaway perspective view of a tank with a cone shaped device, to remove material from the body of liquid within the tank.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1-8, there is shown a tank or reservoir 20 for holding liquid. The liquid may include water with foreign material therein such as sludge or animal waste. Extending horizontally across the bottom wall or floor 21 of tank 20 is housing or conduit 22 having an internal cavity 23 in which is positioned a solid liquid displacement insert 24. Cavity 23 may take a variety of shapes, such as, an inverted u-shape or an inverted V-shape. Fixedly mounted to the bottom edge portions 27 and 28 (FIG. 2) of conduit 22 are respectively, gas emitting tubes 25 and 26 having outlets 29 pointed in the direction of the channel 30 formed between the upwardly facing surfaces 31 of insert 24 and the downwardly facing surfaces 32 of conduit 22.

The bottom edge portions 27 and 28 are spaced apart from floor 21 by spacers 33 fixedly mounted to the conduit 22. Spacers 33 are located and spaced apart along the length of the conduit thereby spacing the bottom edge of edge portions 27 and 28 apart from floor 21 and forming a plurality of inlets 34 (FIG. 1) through which the water and sludge may flow into the conduit. Tubes 25 and 26 are connected to a source 35 of pressurized gas such as air.

Conduit 22 includes an outlet 40 (FIG. 1) leading from cavity 23 into an exit pipe 41 mounted thereto. The pipe extends generally upwardly being attached to an optional conventional airlift pump 42 operable to lift the liquid and foreign material within pipe 41 and cavity 23 from outlet 40 and up through lift pipe 41 exiting the tank or reservoir via outlet pipe 43. Pump 42 is not required for the proper functioning of the device.

In the alternate version shown in FIG. 2, the pair of channels 30 intersect atop the upper corner of the triangular shaped insert 24 forming an upper most surface 50 of cavity 23. Surface 50 extends upwardly from conduit end 60 to conduit end 61 at an approximate angle from one to ten degrees. Thus, the gas or air emitted by tubes 25 and 26 form bubbles which move along surface 50 in a direction from end 60 to end 61 due to the natural inclination of the bubbles to seek the top surface of the liquid within the tank. As the air bubbles extend along surface 50, they cause the liquid and foreign material to move in a direction from end 60 to 61 thereby exiting the conduit via outlet 40 flowing into pipe 41. The interior upper most surface 50 of cavity 23 is shown in the fragmented view in area 64 of FIG. 7 to illustrate the increasing elevation of surface 50 arranged at an angle 62 relative to the horizontal 63.

Ends 60 and 61 are closed in order to allow fluid flow into cavity 23 only through passages 34 with the fluid flow then exiting via outlet pipe 40. End 60 is shown open in the drawings to illustrate more clearly the internal channels. Surface 50 is spaced apart from floor 21 by distance 70 (FIG. 2) at end 60 with distance 70 increasing to distance 72 (FIG. 8) at the opposite end 61. In other words, surface 50 slopes upwardly relative to floor 21 as the surface extends from closed end 60 to closed end 61. The bottom edge portions 27 and 28 (FIG. 2) are parallel to the floor of the tank or the reservoir and parallel to the horizontal axis 63 (FIG. 7) with surface 50 being arranged at an acute angle 62 of approximately from one to ten degrees.

The apparatus shown in the drawings can be used for removing sludge from a reservoir of liquid including any type of foreign material that is mixed with water located in the reservoir. Further, the apparatus may be used for moving or lifting the liquid, such as water, to oxygenate the liquid. Housing 22 is elongated and has a downwardly opening cavity or enclosure extending between the opposite ends of the housing. The opposite edge portions 27 and 28 extend along the length of the enclosure and are supported by means including spacers 33 resting atop the floor of the reservoir forming inlets between the edge portions and the floor for the sludge and liquid in the reservoir to flow into cavity 23. The gas emitters 25 and 26 extend along the length of the opposite edge portions and are connected to a source 35 of pressurized gas to emit gas into the cavity of the enclosure thereby drawing liquid and sludge via the inlets 34 into the cavity. The outlets 29 of the gas emitters 25 and 26 are pointed upwardly into channels 30 formed between the downwardly facing surface 32 of the housing and the upwardly facing surface 31 of structure 24 located within the cavity. In other words, surfaces 31 and 32 cooperatively form the channel through which the liquid and sludge is directed upwardly from the inlets 34 to the upper most portion or surface 50 of the cavity formed by the intersection of the pair of channels 30 intersecting at the apex of the triangular shaped structure 24. An outlet 40 located at one end of the housing is connected to an optional lift pump 42 for withdrawing the liquid and sludge from the cavity. Surface 50 extends generally upward at from one to ten degree angle relative to the horizontal from end 60 to end 61 to allow the natural tendency of gas bubbles to rise thereby pulling the sludge in the liquid upwardly to the outlet with minimum external energy required to move the liquid and sludge.

Structure 24 is solid and relatively heavy so as to remain stationary on the floor of the reservoir. Structure 24 is a flow direction device positioned between the opposite edge portions 27 and 28 of the enclosure.

FIGS. 3 and 4 illustrate an alternate version whereas FIGS. 5 and 6 illustrate a further alternate version. Both versions are identical to the version of FIGS. 1 and 2 with exception that the one alternate version includes a booster air emitter 80 (FIGS. 3 and 4) located atop the triangular structure 24 whereas the further alternate version in FIGS. 5 and 6 includes a slot 90 extending the length of structure 24 and also from the top portion of structure 24 to the base of structure 24 which rests atop the floor of the reservoir. Slot 90 empties into a heavy sludge holder 91 cavity located beneath structure 24 and housing 22. In the versions shown in FIGS. 2-8, the upwardly facing surfaces 31 of structure 24 as well as surfaces 32 are planar.

In the version of FIGS. 3 and 4, the apparatus is identical to the apparatus previously described and illustrated in FIGS. 1 and 2 with the exception that a booster gas emitter 80 is mounted to the top edge of the triangular shaped structure 24. Emitter 80 is a hollow tube extending the length of structure 24 and has a plurality of gas outlets 81 pointed upwardly toward the upper most portion 50 of cavity 23. Outlets 29 of the tubular gas emitters 25 and 26 are likewise oriented upwardly to pull the sludge and liquid through the inlets 34 and into the channel formed between surfaces 31 and 32 causing fluid flow towards the uppermost portion 50 of the cavity whereas emitter 80 adds additional gas in the form of bubbles to the cavity with the bubbles from outlets 81 flowing toward the upper most portion 50 providing additional pressure to force the liquid and sludge from end 60 of the enclosure to end 61 of the enclosure. The outlets 81 and 29 are located along the length of enclosure 22 in the version of FIGS. 3 and 4.

In the alternate version illustrated in FIGS. 5 and 6, the apparatus is identical to the apparatus disclosed and illustrated in FIGS. 1 and 2 with the exception that a slot 90 extends entirely through structure 24 being vertically arranged to extend from the base of the triangular structure 24 to the top of the structure. Likewise, slot 90 extends along the entire length of structure 24 from end 60 to end 61 of enclosure 22. The heavy sludge holder 91 is a cavity located beneath structure 24 to allow sludge which is too heavy to be conveyed through outlet pipe 41 to simply fall into the slot where it drops into holder 91. Slot 90 forms a passage extending from the cavity 23 to the cavity formed by holder 91. Means are provided to empty heavy sludge holder 90 and to anchor the portions of structure 24 that are split by slot 90.

Figure 10:
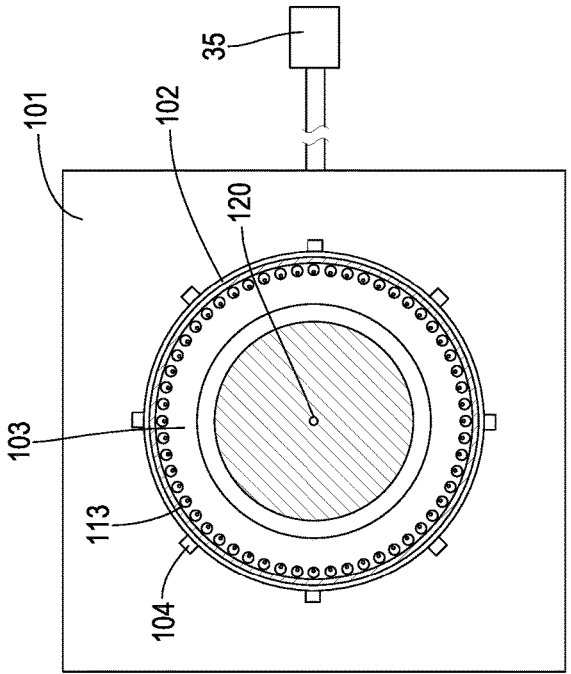
FIG. 10 is an enlarged cross-sectional view of the cone shaped device taken along the line 10-10 of FIG. 11 and viewed in the direction of the arrows.
Figure 11:
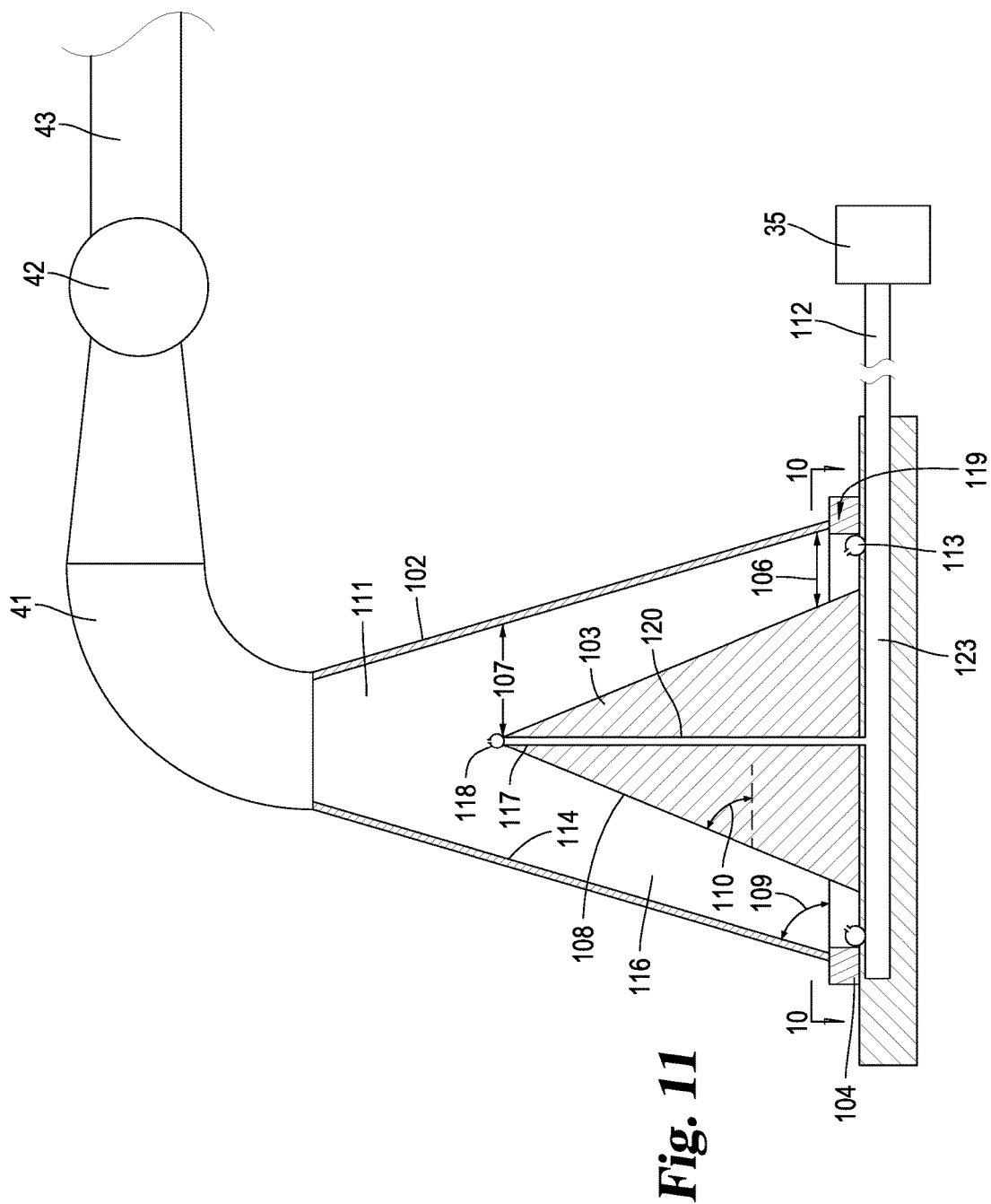
FIG. 11 is an enlarged cross-sectional view of the cone shaped device taken along the line of 11-11 of FIG. 9 and viewed in the direction of the arrows.

A cone-shaped device 100 is shown in FIG. 9-11 and is positioned in tank or reservoir 20 atop tank floor 21 in lieu of conduit 22 shown in FIG. 1. Multiple devices 100 with or without conduit 22 may also be used in the tank. Cone-shaped device 100 is designed to remove large amounts of liquid with or without foreign material from the tank with minimum energy. Device 100 has an outer cone shaped shell 102 mounted atop but spaced apart from an inner cone 103. Shell 102 is fixedly mounted atop spacers 104 which are fixedly mounted atop base 101 whereas cone 103 is fixedly mounted atop a base 101 that extends outward from the sides of shell 102 to provide stability to the device and prevent the device from tipping over within the tank. Spacers 104 are spaced apart elevating the bottom edge of shell 102 apart from base 101 forming inlets 119 between spacers 104 and between the bottom edge of shell 102 and base 101.

A source of pressurized gas, namely, air 35 is connected by line 112 to passage 123 provided in base 101 which in turn is connected to air outlets 113 positioned atop base 101 between the inner surface 114 of the shell 102 and the outwardly facing surface 108 of the cone 103. Thus, air bubbles move upwardly from the base in the conical shaped channel 116 surrounding cone 103 between the cone and the shell. The plurality of air outlets 113 are positioned around the circumference of cone 103 allowing the air bubbles to surround the cone and move upwardly toward the top 117 of the cone.

Channel 116 is conical in shape since it surrounds cone 103 and expands in width from the base 101 to the top 117 of the cone since surface 108 of cone 103 is at an angle 110 of 45 degrees relative to horizontal which is less than the angle 109 of 60 degrees formed by the inner surface 114 relative to horizontal of shell 102. Thus, the inwardly facing surface of the outer cone side wall diverges for the outwardly facing surface of the inner cone side wall in an upward direction. As a result, the air bubble flow velocity within channel 116 decreases as the bubbles rise to the top of the cone carrying any foreign material within the channel to the top of the cone.

A booster air bubble outlet 118 is provided at the top 117 of cone 103 and is connected by an air passage 120 extending through cone 103. Passage 120 is connected to passage 123. The air bubbles exiting outlet 118 flow into open ended chamber 111 located between the top of the cone and the outlet pipe 41 between the inwardly facing surface 114 of shell 102. Likewise, the air bubbles and foreign material exit channel 116 into chamber 111 at a relative low velocity as compared to the velocity within channel 116 adjacent base 101. Thus, the air bubbles exiting outlet 118 increase or boost the velocity of the liquid and foreign material in channel 116 and chamber 111 causing flow toward outlet conduit 41. An optional conventional airlift pump 42 is operable to lift the liquid and foreign material within pipe 41 and then exiting the tank or reservoir via outlet pipe 43.

In one version of the shell shaped cone 100, channel 116 was 4 inches wide between surfaces 108 and 114 at location 106 adjacent base 101 and 6 inches wide at location 107 at the top 117 of cone 103. In this same version, the inlets 119 were ½ inch high between the bottom edge of shell 102 and base 101 between spacers 104. A total of eight spacers were used to space the shell atop the base. Likewise, in the same version a total of 65 air outlets 113 having ⅛ inch diameter outlet openings were positioned around the circumference of channel 116 adjacent base 101 whereas the air outlet 118 atop cone 103 had a ¼ inch diameter outlet opening. The diameter of cone 103 adjacent base 101 was 36 inches. The base in the same version weighed at least 50 pounds.

Figure 12:
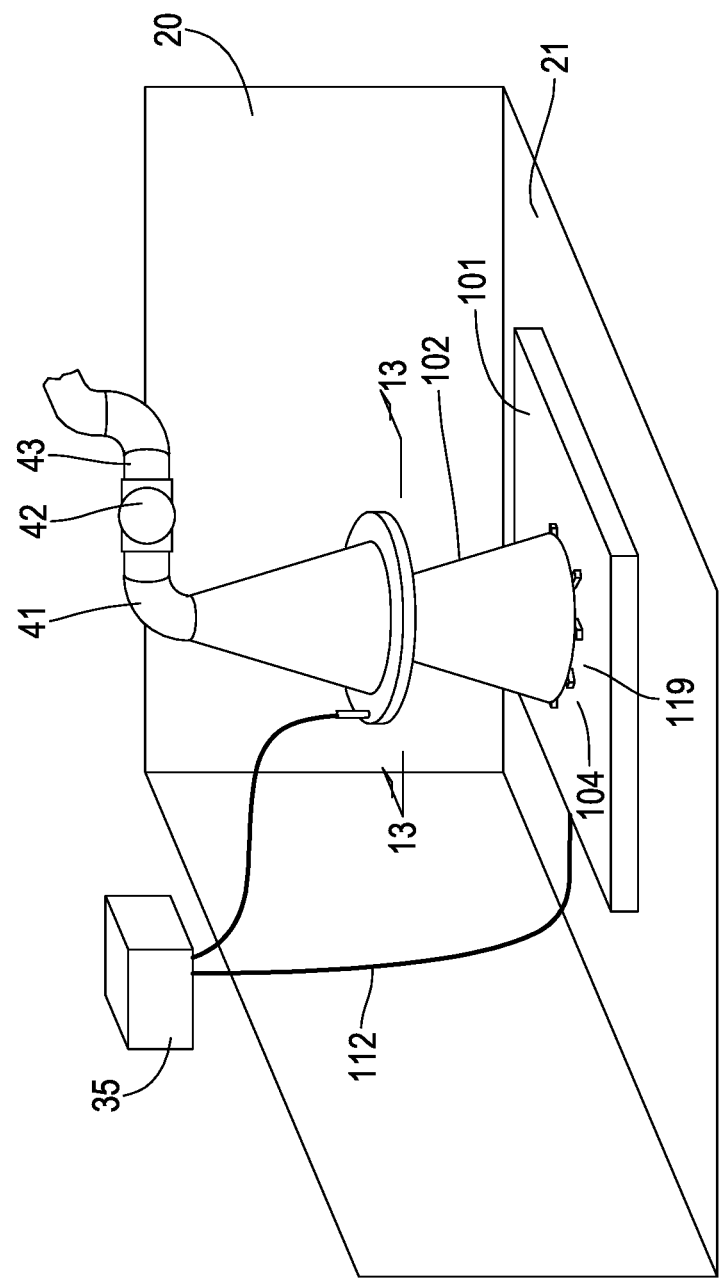
FIG. 12 is a perspective view of a further alternative embodiment incorporating the present invention of coupling two lifting devices together forming truncated cone shaped primary and supplemental liquid lifts coupled together.
Figure 13:
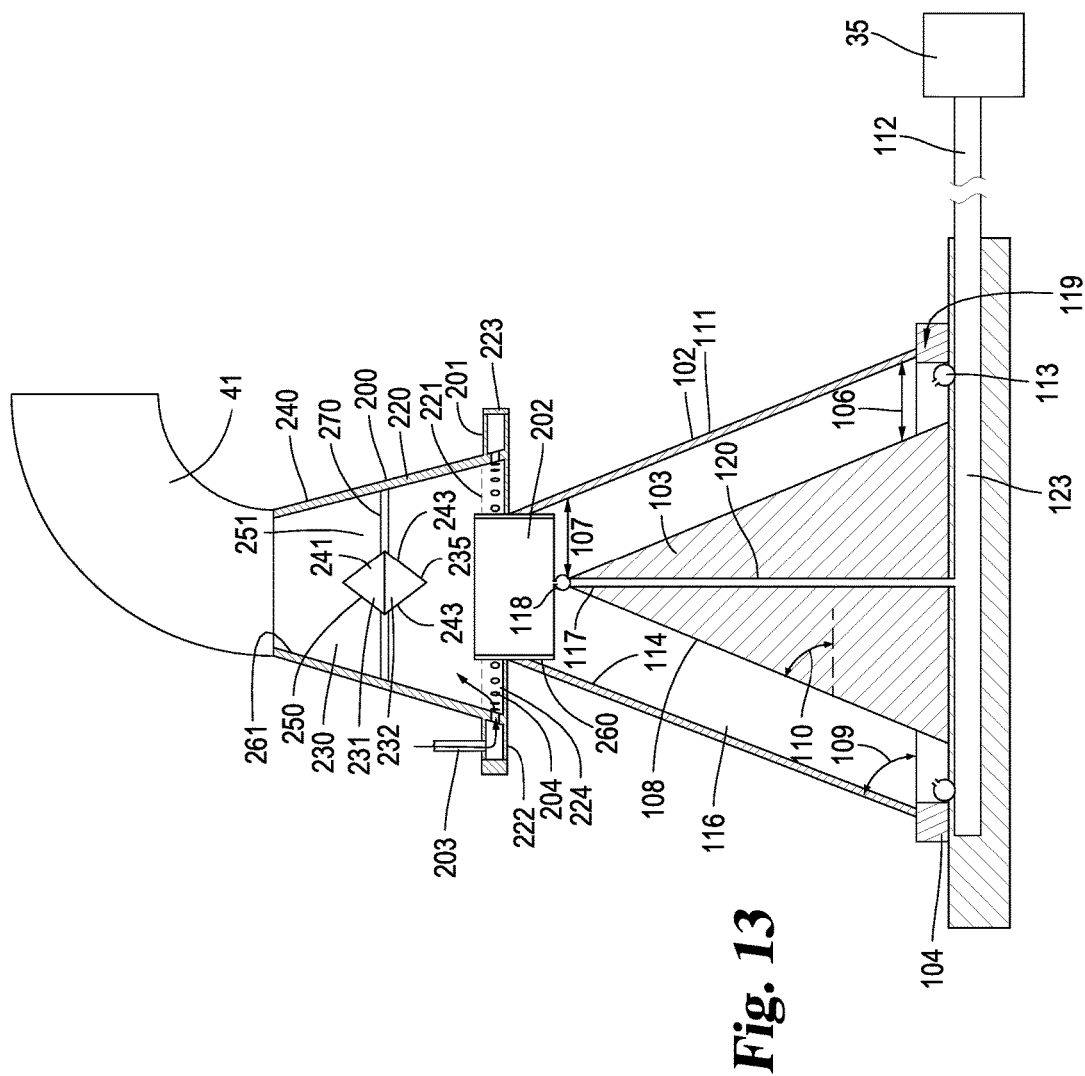
FIG. 13 is an enlarged cross sectional view of the lifting devices of FIG. 12 taken along the line 13-13 of FIG. 12 and viewed in the direction of the arrows.

Another embodiment incorporating the present invention is shown in FIGS. 12 and 13 with a bottom water lift coupled to a top water lift to maximize the water lift from the reservoir with minimum energy required to drive the lifts. The bottom or first water lift 102 has been previously described and illustrated in FIGS. 9, 10 and 11 with like numbers utilized for the identification and description of the components and features thereof.

A second truncated conical structure 200 (FIG. 13) is mounted atop the bottom truncated conical structure 102. Structure 200 includes a conical shaped outer wall 220 mounted atop a disk shaped air chamber 201. Wall 220 extends through top wall 221 of chamber 201 whereas bottom wall 222 of chamber 201 serves as a base for structure 200 being connected to and supporting the conical shaped side wall 220. The bottom wall 222 of chamber 201 is joined to top wall 221 by a continuous cylindrical wall 223 thereby defining a hollow interior 224 for the air chamber. An air nipple 203 connected to the source of pressurized air 35 is mounted to wall 221 and opens into interior 224. Nipple 203 is connected to source 35 by means of a standard conduit. A plurality of apertures 204 extend through the side wall 220 of structure 200 allowing air within the hollow interior 224 of air chamber 201 to flow into the lift cavity 230 enclosed by side wall 220 of structure 200. Apertures 204 extend through side wall 220 immediately along and adjacent the bottom edge portion of the side wall 220 and are positioned within the hollow interior 224 of chamber 201 thereby causing the pressurized air to impinge upon the inwardly facing surface 261 of side wall 220 with the air moving upwardly carrying the liquid or water towards the top end 240 of structure 200.

Tube 202 is mounted to bottom wall 222 of chamber 201 and extends through the top wall 221 of the air chamber opening into lift cavity 230. The bottom end of tube 202 extends through bottom wall 222 of chamber 201 and into the top of the bottom lift 102 allowing water flow from the bottom water cavity 116 to flow upwardly through air chamber 201 and into lift cavity 230.

An accelerator 241 is mounted within cavity 230 and consists of a top cone 231 and a bottom cone 232 mounted back to back so that the base of the top cone is mounted to and in contact with the upwardly facing base of cone 232. Accelerator 241 is supported in the middle of cavity 230 by a plurality of radially extending rods 270 having outer ends attached to the side wall 220 of the cone and inner ends attached directly to the accelerator. The accelerator is positioned in line with the outlet of tube 202. Thus, cone 232 is pointed downward with the apex 235 of the cone located at the lower most portion of accelerator 241 further causing the water flowing upwardly to impinge upon the diverging conical surface 243. The top cone 241 includes an outer conical surface 250 which converges towards the top of side wall 220 forming a water channel 251 through which the water flowing upwardly from the bottom cone accelerates.

The bottom lift includes a downwardly opening enclosure with a truncated conical shaped side wall of shell 102 forming a primary or first water lift cavity 111. The enclosure has a water inlet 119 for liquid or water from the reservoir to flow into the cavity and further has a water outlet, namely the top end 260 of shell 102. The source of pressurized air 35 has first gas outlets 113 opening into the cavity and forces the water in the cavity to move upwardly to the water outlet at the top end 260 of the enclosure.

The truncated cone shaped structure 200 is located above the bottom lift device and has an inwardly facing surface 261 that forms a second or supplemental water lift cavity 230. The water outlet 260 of the bottom lift opens into the supplemental water lift cavity 230. The source of pressurized gas 35 has a second gas outlet in fluid communication via the interior 224 of air chamber 201 and thus, the supplemental water lift cavity 230.

The water accelerator 241 located in cavity 230 is positioned above the top end of the lower lift and restricts the size of the top lift cavity 230 forming a water flow channel 251 between the accelerator and the side wall 220 and cooperatively with the source of pressurized air accelerates water flow upwardly through channel 251. Thus, the lower cone structure shown in FIG. 13 provides a primary water lift function whereas the top cone 200 provides a supplemental water lift thereby increasing the overall flow of water from the reservoir. The water eventually flows out of tube 43 thereby falling back on the water within the reservoir further aerating the water.

The present invention contemplates and includes use of the upper water lift structure 200 without the necessity of utilization of the lower water lift structure depending upon the requirements for moving the water. In such a case, tube 202 is provided with inlets, such as apertures or is spaced apart from the floor of the reservoir allowing water to enter tube 202 and then moving upwardly under the force of the pressurized air entering cavity 230 via chamber 201.

Figure 14:
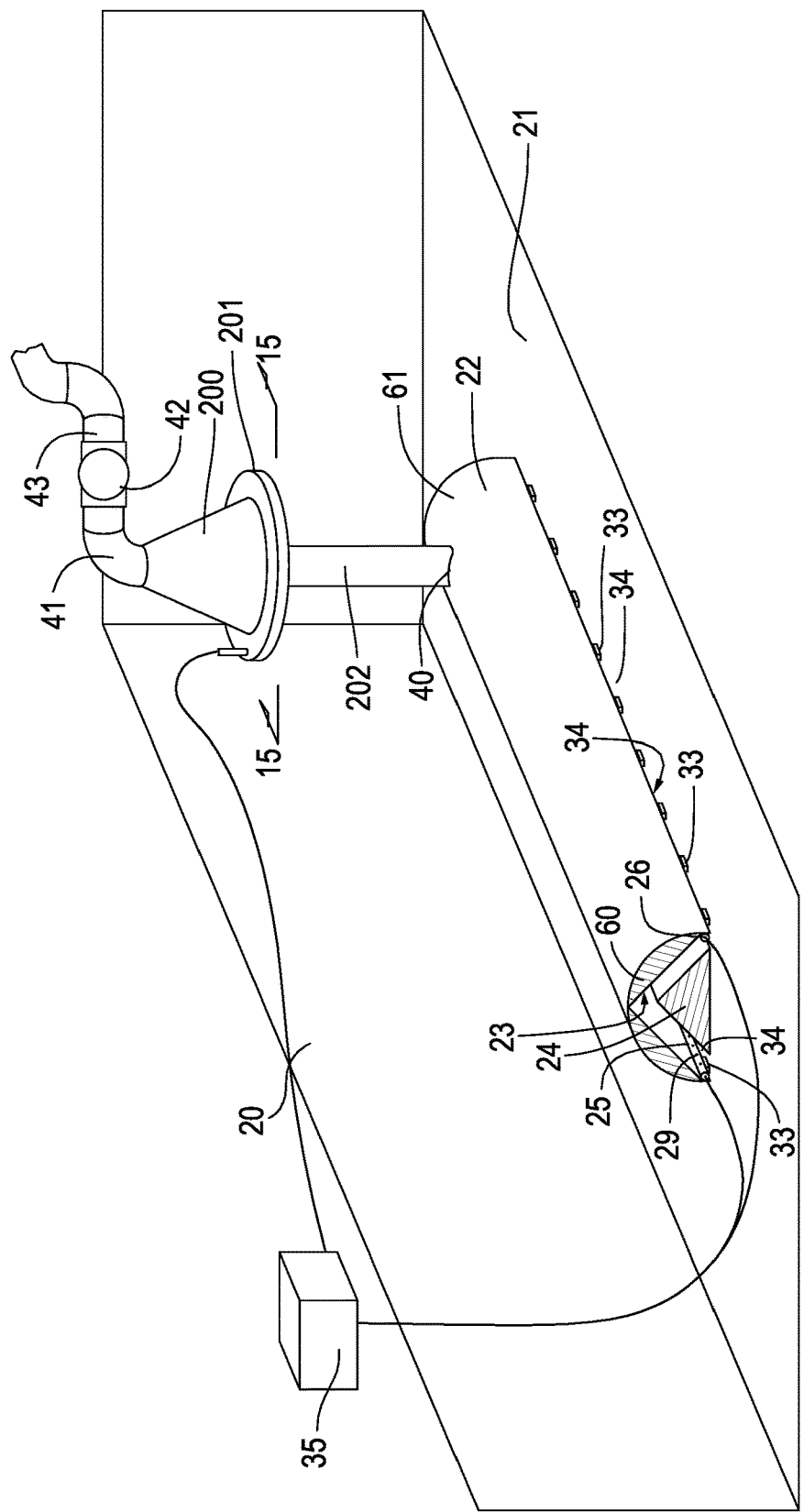
FIG. 14 is a perspective view of the another alternative embodiment incorporating the present invention coupling two lifting devices together utilizing a horizontally extending primary lift coupled to a truncated cone shaped supplemental lift.
Figure 15:
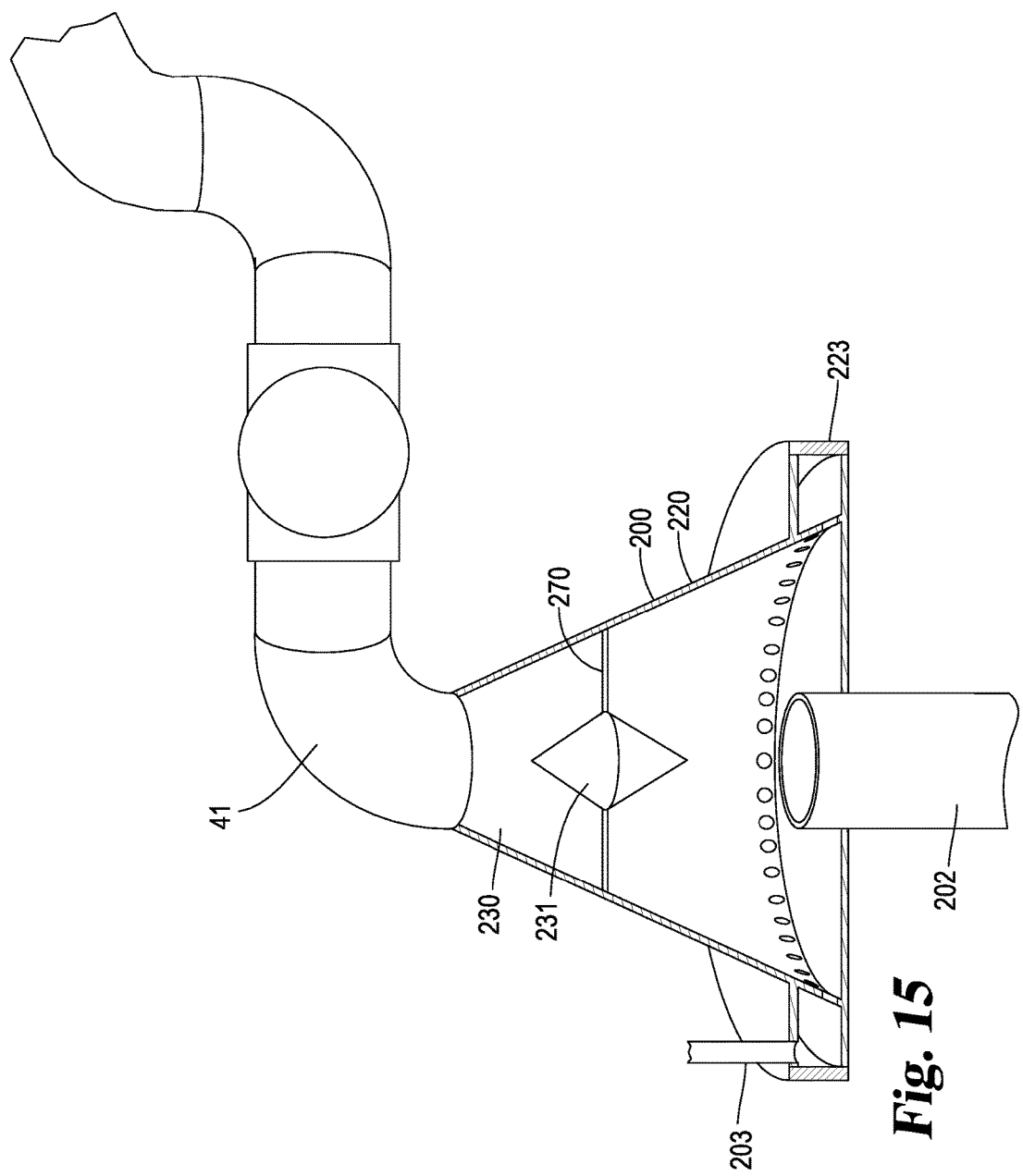
FIG. 15 is an enlarged cross sectional view of the supplemental lift of FIG. 14 taken along the line 15-15 of FIG. 14 and viewed in the direction of the arrows.
Figure 16:
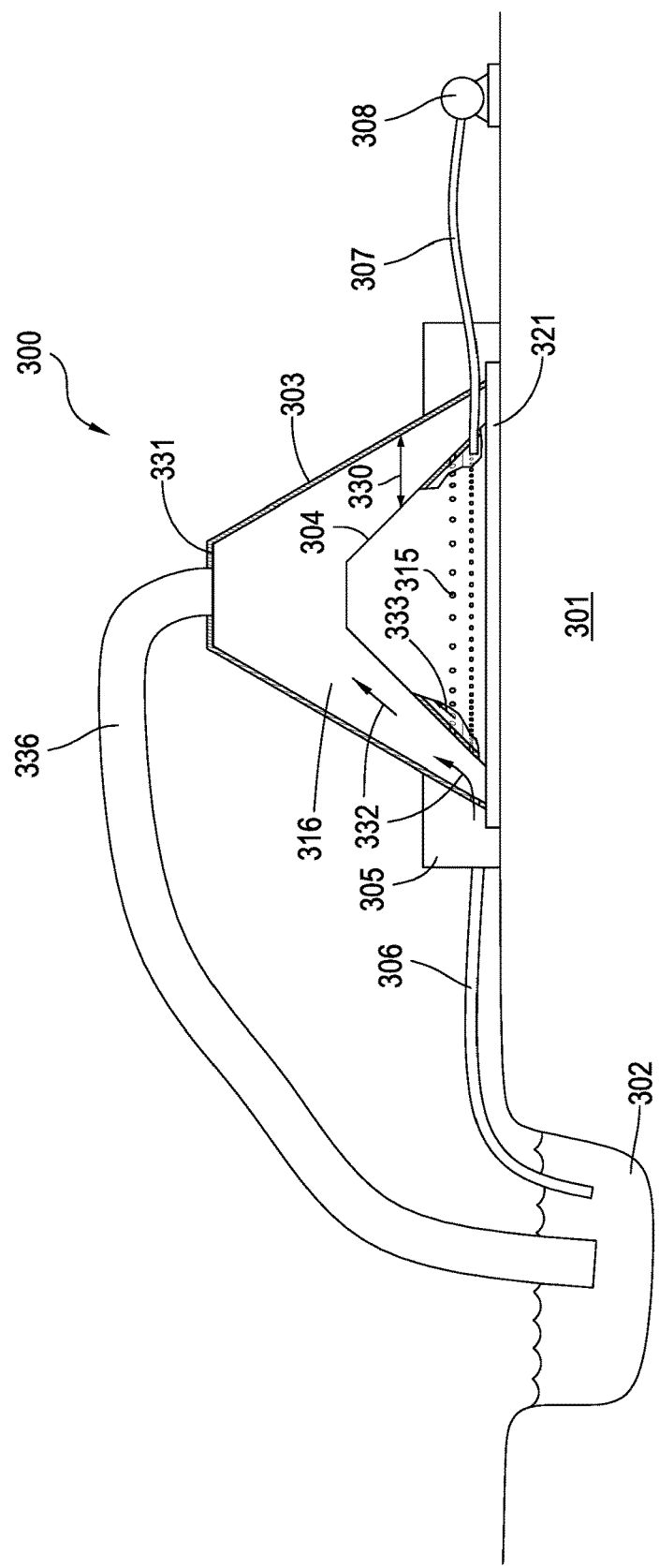
FIG. 16 is a fragmented side view of the preferred embodiment of the present invention illustrating the location of the invention on dry land.
Figure 17:
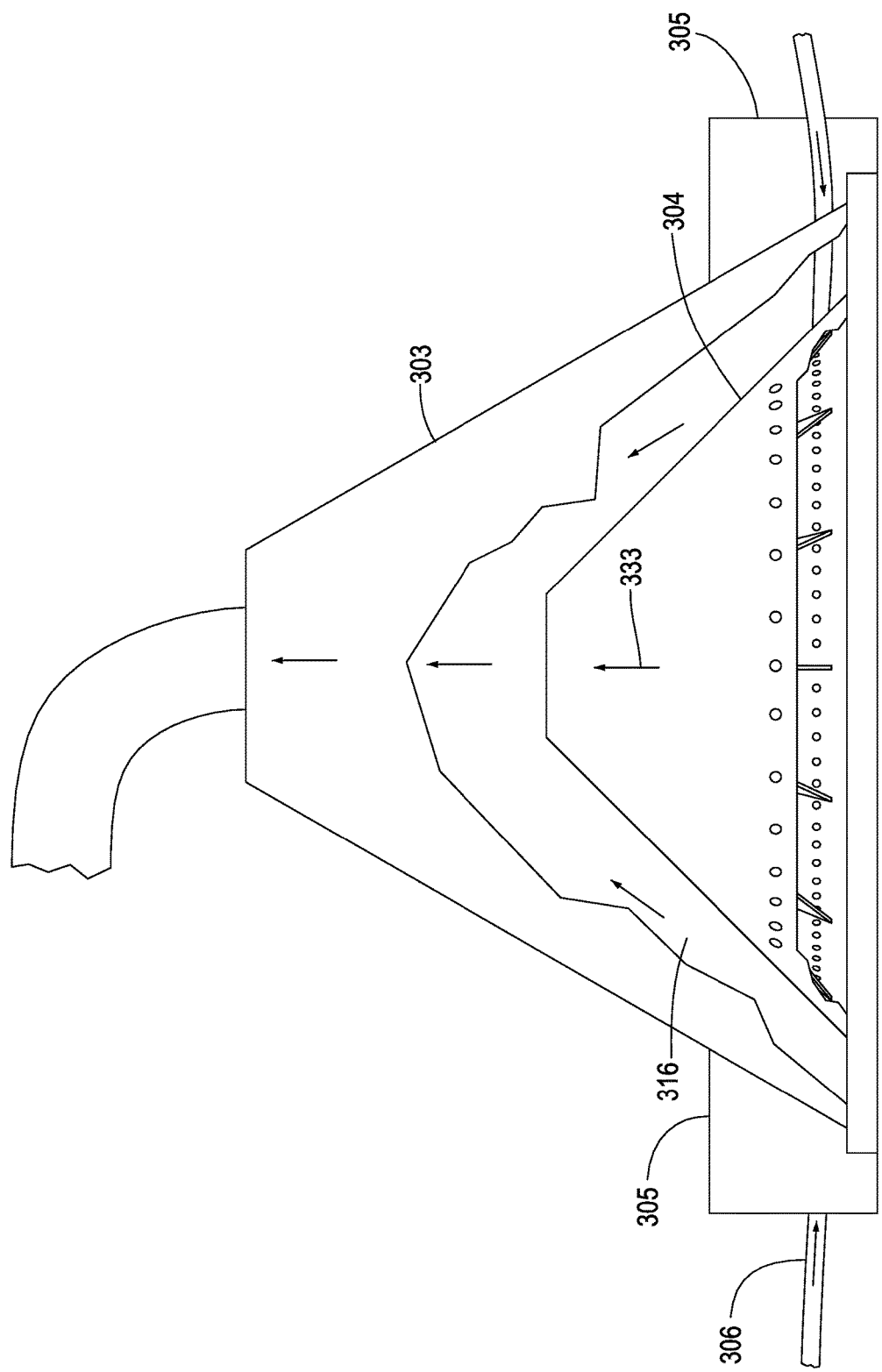
FIG. 17 is an enlarged cross sectional view of the outer cone containing the inner cone located in a sealed vessel used in the invention of FIG. 16.
Figure 18:
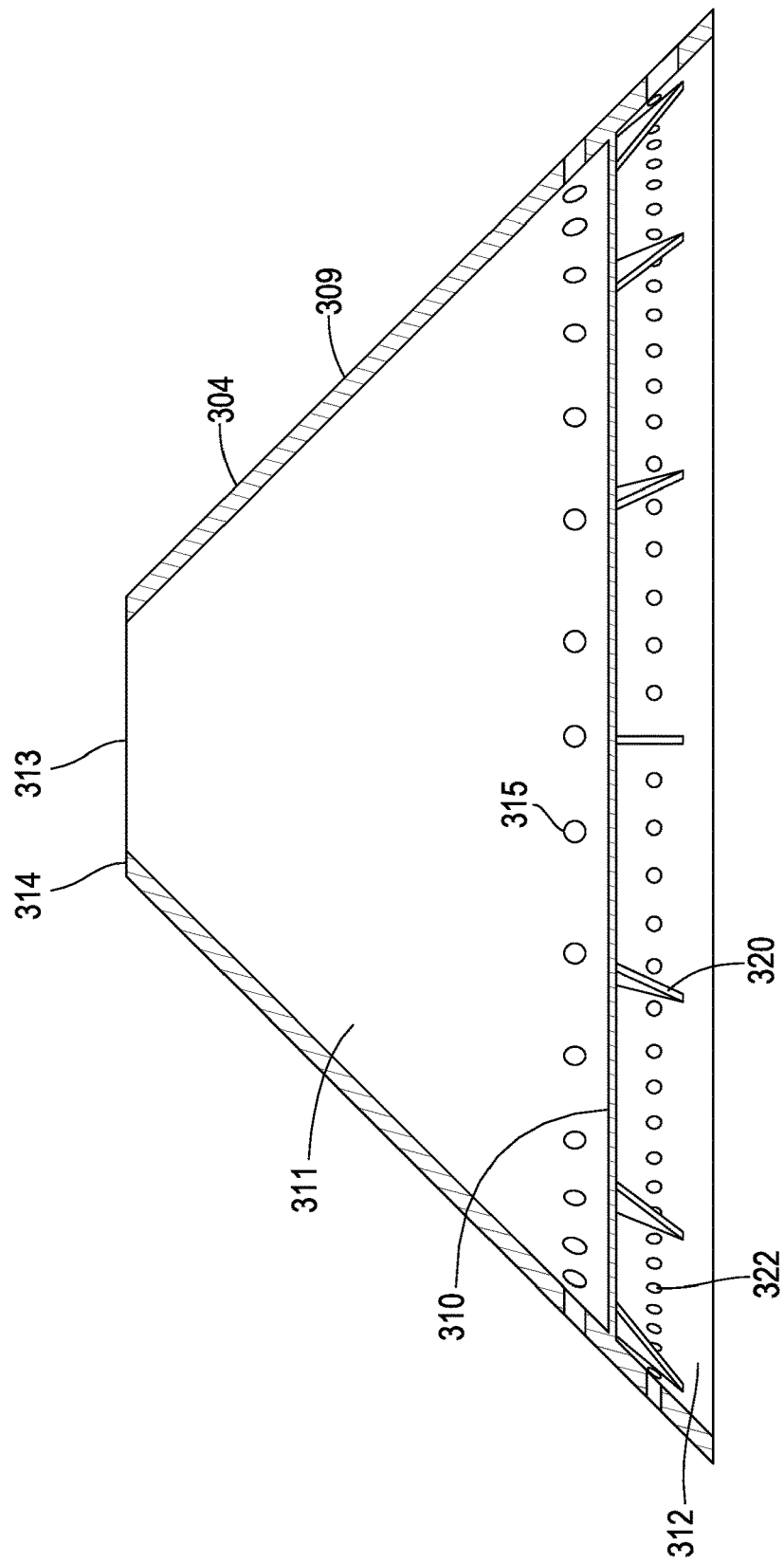
FIG. 18 is a fragmented side view of the inner cone of FIG. 17.
Figure 19:
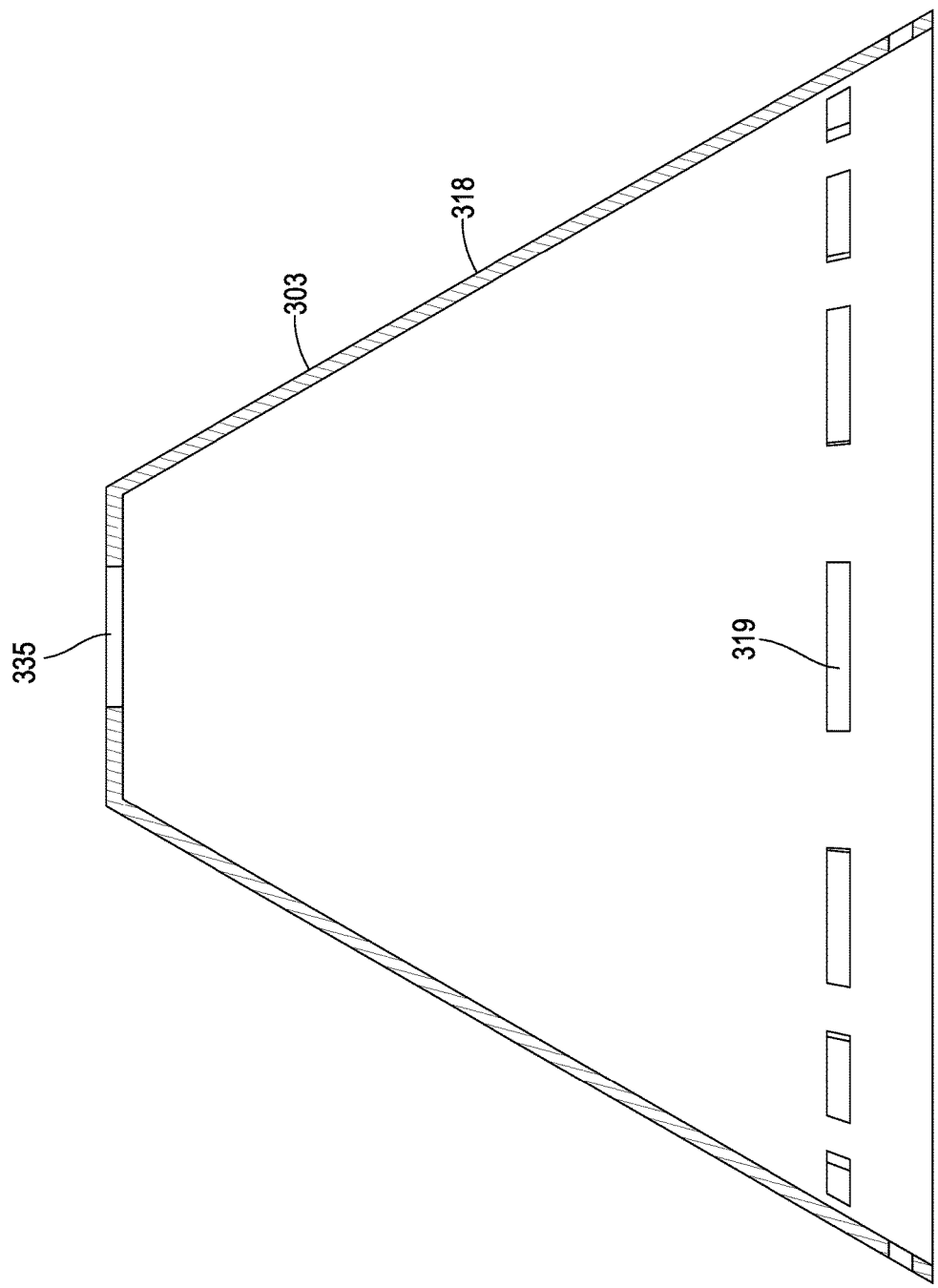
FIG. 19 is a fragmented side view of the outer cone of FIG. 17.

In the embodiment shown in FIGS. 12 and 13, the lift devices are both conical in configuration. An alternate embodiment of the invention includes the horizontally extending enclosure 22 (FIG. 14), in turn, having an outlet 40 connected to tube 202 extending into the truncated conical shaped enclosure 200. The bottom lift is formed by enclosure 22 which has previously been described and shown in FIG. 1. That is the lift device shown is FIG. 1 is identical and the same as the bottom lift device shown in FIG. 14. Thus, the lower horizontally extending enclosure 22 (FIG. 14) provides a primary water lift capacity whereas the top conical shaped enclosure 200 provides a supplemental water lift capacity. The top conical shaped enclosure 200 shown in FIGS. 14 and 15 is identical and the same as the enclosure 200 shown and described in FIG. 13 with the exception that tube 202 extends a greater vertical distance for the embodiment of FIGS. 14 and 15 as compared to FIG. 13.

The preferred embodiment of the present invention is shown in FIGS. 16 through 19 and is designed to be located entirely on dry land allowing quick installation. Aerating System 300 is located on dry land 301 with a reservoir of water 302 nearby. The purpose of system 300 is to introduce oxygen into water removed from the reservoir and return aerated water back to the reservoir while placing the system on dry land.

System 300 includes an outer cone 303 positioned atop a base plate 321 resting on land 301 with an inner cone 304 located within the outer cone 303. Both cones are located in a water vessel 305 sealed circumferentially to the outer surface of cone 303. A water conduit 306 extends from reservoir 302 into vessel 305 and delivers the unaerated water to the vessel. An air conduit 307 extends from a conventional air compressor 308 and into the lower portion of the inner cone 304.

Inner cone 304 has a conical shaped side wall 309 (FIG. 18) with a disc shaped plate 310 sealingly joined to wall 309 and forming with the side wall an upper chamber 311 and a lower chamber 312. Chamber 311 is an air and water tight sealed chamber with the exception that an exit hole 313 is provided in the top 314 of wall 309 extending across chamber 311 being joined to side wall 309 and with the exception that a plurality of holes 315 extend through side wall 309 above plate 310 allowing water/air mixture to flow into chamber 311 from the water passage 316 (FIG. 17) extending between the mutually facing side walls of the outer cone 303 and inner wall 304.

Plate 310 includes stiffening ribs 320 that are affixed thereto and extend downwardly toward the base plate 321. A plurality of air holes 322 extend through side wall 303 immediately beneath plate 310. Lower chamber 312 is an air chamber receiving pressurized air via air conduit 307 connected at its opposite end to air compressor 308. Introduction of air via conduit 307 into chamber 312 results in the air flowing through air holes 322 into passage 316 introducing bubbles into the water and resulting in the water/air mixture to flow upwardly in passage 316.

The side wall 318 (FIG. 19) of the outer cone 303 has a plurality of slots 319 located beneath the level of water within vessel 305 allowing water from vessel 305 to flow through the slots into passage 316 and mix with the air entering passage 316 via holes 322 with the mixture of water and air then flowing upwardly past holes 315. Some of the mixture of water and air flow through holes 315 into the inner cone 304 and exit the cone via hole 313 located at the top of the inner cone. The pressurized air from compressor 308 forces the air within the lower compartment 312 to flow into the water passage 316 pulling the water from the body of water 302 via conduit 306 into vessel 305 and then upwardly in passage 316 in the direction of arrow 332.

The conical side wall 318 of the outer cone 303 is arranged at a 60 degree angle relative to the horizontal whereas the conical side wall 309 of the inner cone 304 is arranged at a 45 degree angle relative to the horizontal resulting in the width 330 (FIG. 16) of passage 316 increasing as the water/air mixture flows upwardly in the direction of arrow 332 toward the top 331 of the outer cone 303. The water/air mixture entering the inner cone via holes 315 flows upwardly in the direction of arrow 333 exiting via hole 313 at the top of the inner cone mixing with the upwardly flowing water/air mixture in passage 316 with the combined mixture then exiting via outer cone exit hole 335. The aerated water exiting hole 335 flows via conduit 336 coupled to hole 335 back into reservoir 302.

Many advantages are achieved with the present invention. In particular, the embodiment of FIG. 12 is particularly useful in moving a great volume of water with foreign material therein while requiring low energy input to the air pump 35 and liquid pump 42. Likewise, the preferred embodiment of FIG. 16 allows for quick installation thereby minimizing the expense of installation and maintenance.

While the invention has been illustrated and described in detail in the drawings and foregoing description, the same is to be considered as illustrative and not restrictive in character, it being understood that only the preferred and alternate embodiments have been shown and described and that all changes and modifications that come within the spirit of the invention are desired to be protected.

What is claimed is:

1. A device located on dry land for withdrawing water from a body of water, aerating same and returning the aerated water back to the body of water comprising:
    a gas compressor located on dry land;
    a water vessel located on dry land;
    an outer cone positioned in said vessel in communication with said vessel, said outer cone having an inwardly facing conical surface;
    an inner cone located within said outer cone with said inner cone having an outwardly facing conical surface spaced apart from said inwardly facing conical surface forming a water passage, said inner cone having a gas chamber in communication with said water passage;
    a water conduit extending from a body of water to said water vessel to convey water from said body of water into said water vessel;
    a gas conduit extending from said gas compressor to said gas chamber directing gas from said compressor into said gas chamber; and,
    a return conduit extending from said outer cone to said body of water to convey aerated water within said outer cone to said body of water.

2. The device of claim 1 wherein:
said inner cone includes a cone plate extending across and within said inner cone forming an upper chamber and said gas chamber with said gas conduit extending to said gas chamber, said inner cone includes a wall surrounding said gas chamber which has a plurality of holes through which said gas flows into said water passage aerating the water therein.

3. The device of claim 2 wherein:
said inner cone has a top end with an exit located within said outer cone, said inner cone includes apertures through which aerated water in said passage flows into said upper chamber of said inner cone and then flows from said upper chamber into said outer cone via said exit mixing with aerated water in said passage.

4. The device of claim 3 wherein:
said inwardly facing conical surface diverges from said outwardly facing surface in an upwardly direction.

5. The device of claim 4 and further comprising:
a base plate supporting said outer cone and said inner cone with said base plate resting atop dry land.

6. The device of claim 1 wherein:
said outer cone includes slots allowing water in said water vessel to flow into said outer cone;
said gas chamber includes apertures allowing gas within said gas chamber to flow into said water passage creating bubbles in said water in said water passage.

7. The device of claim 6 wherein said inner cone includes a cone plate extending across and within said inner cone forming an upper chamber and said gas chamber.

8. A device located on dry land for withdrawing water from a body of water, aerating same and returning the aerated water back to the body of water comprising:
a gas compressor located on dry land;
a water vessel located on dry land;
an outer case positioned in said vessel in communication with said vessel, said outer case having an inwardly facing surface;
an insert located within said outer case with said insert having an outwardly facing surface spaced apart from said inwardly facing surface forming a water passage, said gas compressor directing gas into said insert, said insert includes openings allowing gas within said insert to flow into said water passage;
a water conduit extending from a body of water to said water vessel to convey water from said body of water into said water vessel; and,
a return conduit extending from said outer case to said body of water to convey aerated water within said outer case to said body of water.

* * * * *